United States Patent
Day

(10) Patent No.: US 7,441,822 B1
(45) Date of Patent: Oct. 28, 2008

(54) ADJUSTABLE VEHICLE SEAT

(75) Inventor: Robert Christopher Day, Whitmore Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/758,447

(22) Filed: Jun. 5, 2007

(51) Int. Cl.
*B60N 2/12* (2006.01)
*B60N 2/07* (2006.01)

(52) U.S. Cl. ............ 296/65.11; 296/65.01; 296/65.13; 296/65.14

(58) Field of Classification Search ............. 296/65.01, 296/65.05, 65.11–65.15; 297/344.1, 344.11
See application file for complete search history.

(56) References Cited

U.S. PATENT DOCUMENTS

| | | | |
|---|---|---|---|
| 5,156,437 A * | 10/1992 | Hayakawa et al. | 297/335 |
| 5,364,152 A | 11/1994 | Mastrangelo et al. | |
| 5,611,589 A | 3/1997 | Fujii et al. | |
| 5,947,541 A | 9/1999 | Behrens et al. | |
| 6,056,346 A | 5/2000 | Smuk | |
| 6,267,430 B1 | 7/2001 | Cresseaux et al. | |
| 6,270,140 B1 * | 8/2001 | Opfer et al. | 296/65.03 |
| 6,286,886 B1 * | 9/2001 | Odagaki | 296/65.11 |
| 6,361,098 B1 | 3/2002 | Pesta et al. | |
| 6,629,721 B1 * | 10/2003 | Macey | 297/15 |
| 6,648,393 B1 | 11/2003 | Milnar et al. | |
| 6,669,261 B2 * | 12/2003 | Roberts et al. | 296/65.09 |
| 6,692,051 B1 * | 2/2004 | Cook et al. | 296/24.39 |
| 7,229,117 B2 * | 6/2007 | Okuda et al. | 296/64 |
| 7,270,362 B2 * | 9/2007 | Rausch et al. | 296/65.11 |

FOREIGN PATENT DOCUMENTS

| | | |
|---|---|---|
| GB | 2299265 | 10/1996 |
| TW | 239302 B | 9/2005 |

* cited by examiner

*Primary Examiner*—D. Glenn Dayoan
*Assistant Examiner*—Greg Blankenship
(74) *Attorney, Agent, or Firm*—Gifford, Krass, Sprinkle, Anderson & Citkowski, P.C.

(57) ABSTRACT

A seat assembly movable in both longitudinal and transverse directions in an automotive vehicle. The seat assembly includes a seat cushion and an adjuster mechanism. The seat cushion has an upper surface for supporting a seated occupant above a floor of an automotive vehicle and an opposite bottom surface. The adjuster mechanism is coupled to the bottom surface of the seat cushion. The adjuster mechanism includes a set of first wheels that allows movement of the seat assembly in a longitudinal direction along tracks on the floor of the vehicle. The adjuster mechanism further includes a set of second wheels that are arranged generally orthogonal to the first wheels to allow movement of the seat assembly in a transverse direction across the tracks and the floor of the vehicle.

16 Claims, 3 Drawing Sheets

ADJUSTABLE VEHICLE SEAT

FIELD OF THE INVENTION

The invention relates to an automotive vehicle having a seat that is adjustable in both longitudinal and transverse directions along a floor in the vehicle.

BACKGROUND OF THE INVENTION

Automotive vehicles include seats that are adjustable in a longitudinal or "fore and aft" direction along tracks on a floor in the vehicle. Some seat assemblies are removable for placement in different locations within the vehicle. Vehicle seats, particularly those with integrated belt restraints, are large and heavy, which tends to hinder removal and installation of the seat in the vehicle. Accordingly, it remains desirable to provide a vehicle having seats that are movable along the floor of the vehicle in both longitudinal and transverse or cross-car directions to facilitate repositioning of the seats in the different locations in the vehicle.

SUMMARY OF THE INVENTION

According to one aspect of the invention, a seat assembly includes a seat cushion and an adjuster mechanism. The seat cushion has an upper surface for supporting a seated occupant above the floor of an automotive vehicle and an opposite bottom surface. The adjuster mechanism is coupled to the bottom surface of the seat cushion. The adjuster mechanism includes a set of first wheels that allows movement of the seat assembly in a longitudinal direction along tracks on the floor of the vehicle. The adjuster mechanism further includes a set of second wheels that are arranged generally orthogonal to the first wheels to allow movement of the seat assembly in a transverse direction across the tracks and the floor of the vehicle.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
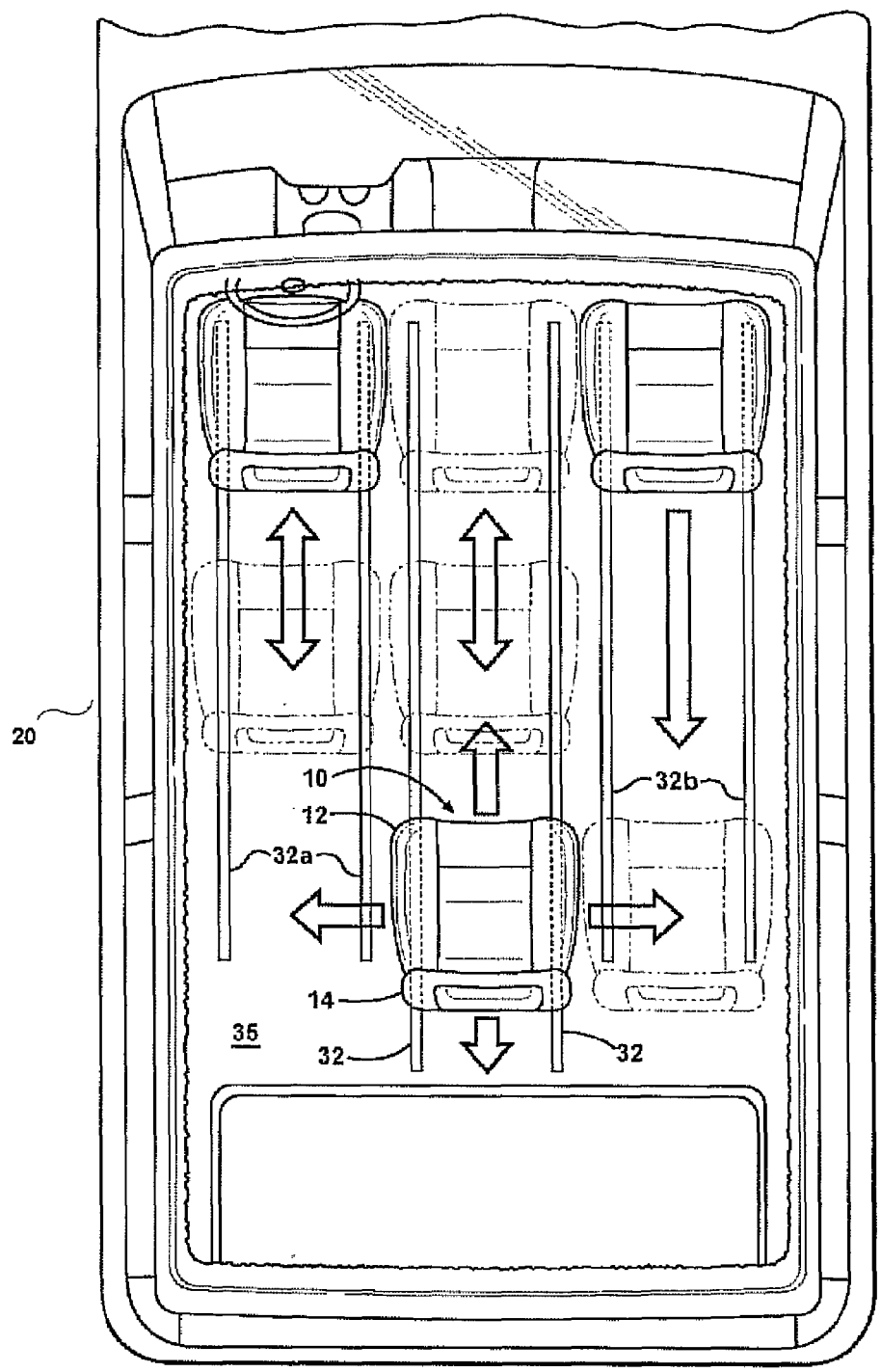
FIG. 1 is a top elevational view of a vehicle according to one embodiment of the invention, illustrating a seat assembly that is movable in both longitudinal and transverse directions along a floor in the vehicle.
Figure 2:
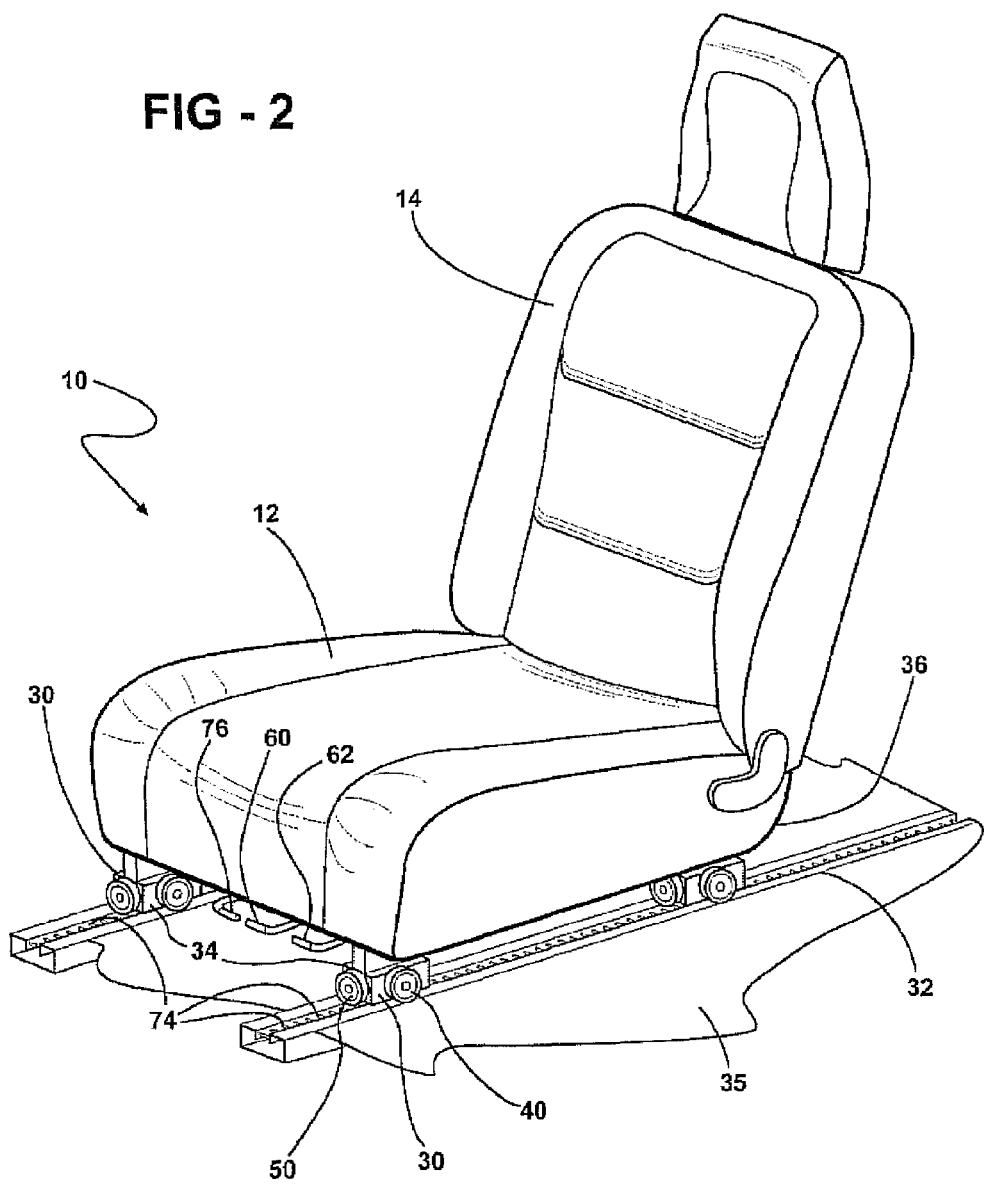
FIG. 2 is a perspective view of the vehicle shown in FIG. 1.

Referring to FIGS. 1 and 2, a vehicle and seat assembly for use in the vehicle according to the invention is indicated at 10. The seat assembly 10 includes a seat cushion 12 having an upper surface that supports a seated occupant above the floor 35 in the vehicle 20. An adjuster mechanism 30 is coupled to the seat cushion 12 and allows the seat assembly 10 to roll in a fore/aft or longitudinal direction along a set of tracks 32 in the floor 35 and in a side-to-side or transverse direction along the floor 35 between different sets of tracks 32.

The adjuster mechanism 30 includes a bracket or housing 34 fixedly secured to a bottom surface 36 of the seat cushion 12. A plurality of first wheels 40 is pivotally coupled to the housing 34 and allows the longitudinal movement of the seat cushion 12 along the tracks 32. A plurality of second wheels 50 are pivotally coupled to the housing 34. The second wheels 50 oriented generally orthogonally relative to the first wheels 40. The second wheels 50 facilitate transverse movement of the seat cushion 12 along the floor 35 of the vehicle between different sets of tracks 32a, 32b. The second wheels 50 are also sized or pitched to the width of the track, indicated at 'w' in FIG. 2a, to provide a positive detent for transversely locating the second wheels 50 relative to the tracks 32, 32a, 32b and ensuring proper alignment of the first wheels 40 for rolling engagement along the tracks 32, 32a, 32b.

The adjuster mechanism 30 includes a lift mechanism for selectively moving one or both of the wheels 40, 50 in a generally vertical direction between a use position extending below a bottom surface 36 of the housing 34 and a retracted position above the use position. The lift mechanism may be manually actuated by levers 60, 62, or by powered actuators, such as electric motors or hydraulic cylinders. In either case, a transmission in the form of a gear seat or linkage may be used to amplify the force applied by the levers 60, 62 or the powered actuators.

The adjuster mechanism 30 also includes a latch mechanism 70 for releasably locking the adjuster mechanism 30 to the tracks 32. More specifically, the latch mechanism 70 includes at least one latch hook 72 operatively coupled to the housing 34 for movement between a locked position hooked or engaged with a transversely extending receiver or pin 74 in the track 32 and an unlocked position disengaged from the pin 74 to allow movement of the seat cushion 12 along or between the tracks 32. The track 32 includes a plurality of the pins 74 so that the seat assembly 10 can be locked in any one of a plurality of corresponding longitudinal positions along the track 32. Preferably, the hook 72 is continuously biased toward the locked position. A release bar or lever 76 or powered actuator may be used for moving the hook 72 between the locked and unlocked positions.

In use, an occupant seated on the seat cushion 12 can adjust the longitudinal position of the seat assembly 10 along the tracks 32 by first disengaging the latch hook 72 from the pin 74. The first wheels 40 are then free to roll along the tracks 32 as the seat assembly 10 is moved in the longitudinal direction in the vehicle.

The occupant can also move the seat assembly 10 to another set of tracks 32a or 32b by moving the seat assembly 10 in a transverse direction in the vehicle. The second wheels 50 must, however, be positioned below the first wheels 40, so that the second wheels 50 can roll along the floor 35 without interference between the first wheels 40 and the tracks 32, 32a, 32b and floor 35.

Figure 2A:
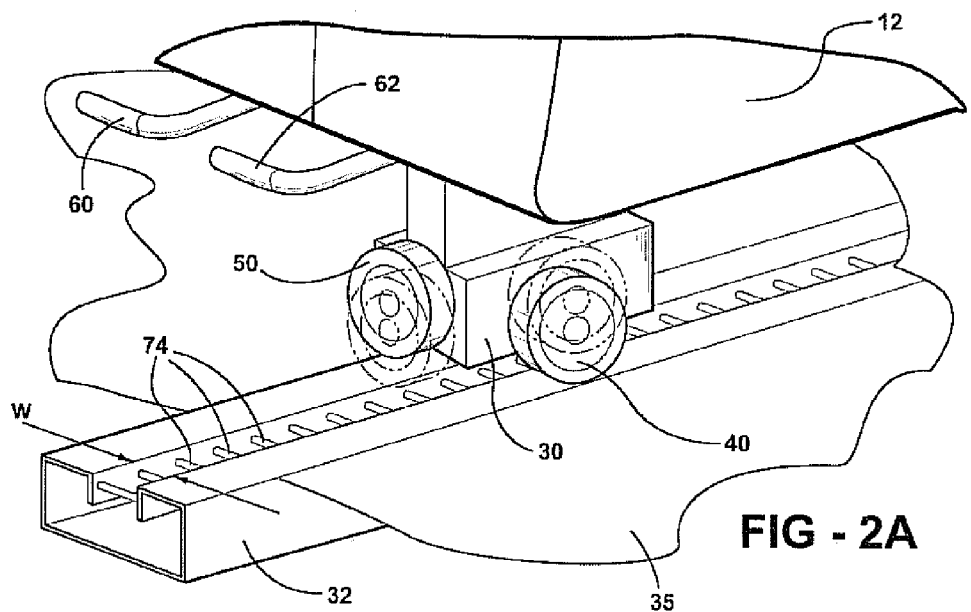
Figure 3:
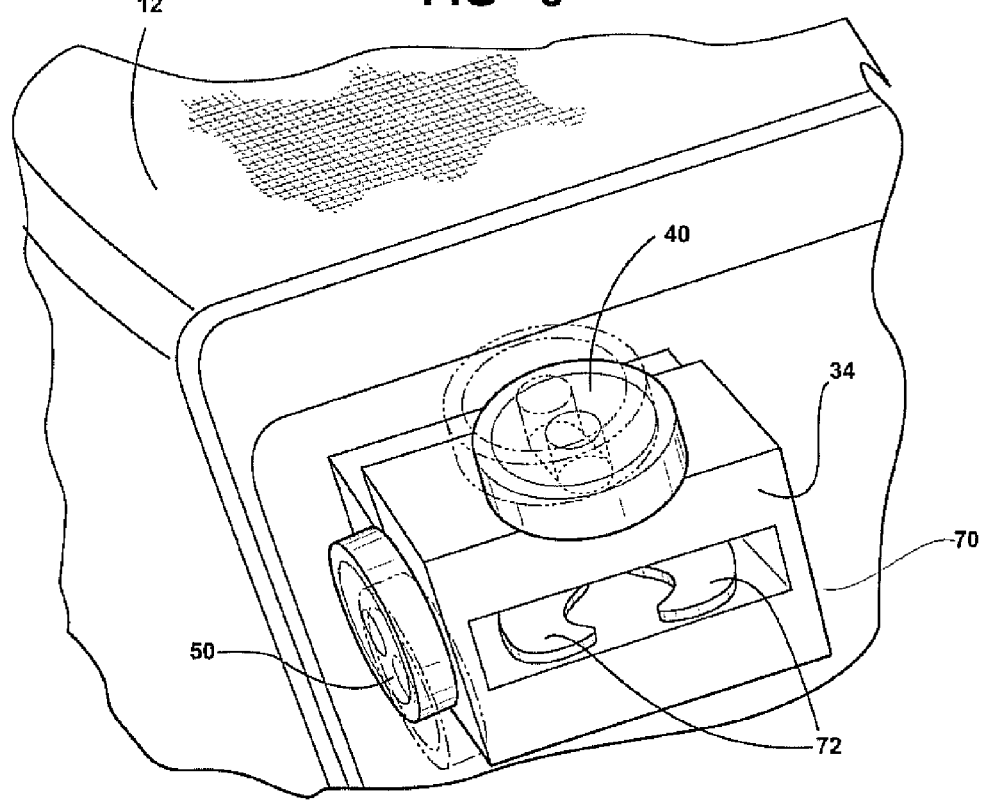
FIG. 3 is a bottom perspective view of the seat assembly of FIG. 1.

In one mode of operation, as illustrated in FIGS. 2A and 3, the first wheels 40 are lifted upwardly by actuating one of the levers 60 and the second wheels 50 are lowered by actuating the other of the levers 62. Alternatively, the vertical position of the first wheels 40 relative to the housing 34 is maintained and the second wheels 50 are moved below the first wheels 40 to provide the necessary clearance between the first wheels 40 and the floor 35 and tracks 32, 32a, 32b during the transverse movement of the seat assembly 10. Alternatively, the vertical position of the second wheels 50 relative to the housing 34 is maintained and the first wheels 40 are moved above the second wheels 50, so as to not interfere with the floor 35 and the tracks 32, 32a, 32b during the transverse movement of the seat assembly 10. It should be appreciated that any one or a combination of these modes may be used.

In the illustrated embodiment, the seat assembly 10 includes a seat back 14 that supports that back of the occupant seated on the seat cushion 12. The seat back 14 may extend upwardly at a fixed angle relative to the seat cushion 12 or, the seat back 14 may be movably coupled to the seat cushion 12 for selective angular adjustment relative to the seat cushion 12 between a plurality of seating positions and/or a stowed position overlying the seat cushion 12. The seat back 14 may also include an integrated belt restraint for securing the occupant to the seat assembly 10.

Alternatively, the seat assembly may include a height adjust mechanism operatively coupled between the seat cushion and the track mechanism to allow selective height adjustment of the seat cushion relative to the track mechanism.

Alternatively, the seat assembly may also include a head restraint that extends outwardly from an upper end of the seat back to support the head of the seated occupant. The head restraint may be integral or otherwise fixedly secured to the seat back. The head restraint may also be height or angularly adjustable relative to the seat back.

The invention has been described in an illustrative manner. It is, therefore, to be understood that the terminology used is intended to be in the nature of words of description rather than of limitation. As should be clear to persons having ordinary skill in the relevant art, many modifications and variations of the invention are possible in light of the above teachings. Thus, within the scope of the appended claims, the invention may be practiced other than as specifically described.

I claim:

1. A seat assembly for use in an automotive vehicle, said seat assembly comprising:
    a seat cushion having an upper surface for supporting a seated occupant above a floor of the vehicle and an opposite bottom surface; and
    an adjuster mechanism coupled to the bottom surface of the seat cushion, the adjuster mechanism including a set of first wheels that allows movement of the seat assembly in a longitudinal direction along tracks on the floor of the vehicle, the adjuster mechanism further including a set of second wheels that are arranged generally orthogonal to the first wheels to allow movement of the seat assembly in a transverse direction across the tracks and the floor of the vehicle.

2. A seat assembly as set forth in claim 1, wherein the first wheels are selectively movable between a retracted position above the second wheels and a use position extending below the second wheels.

3. A seat assembly as set forth in claim 1, wherein the second wheels are selectively movable between a retracted position above the first wheels and a use position extending below the first wheels.

4. A seat assembly as set forth in claim 1, wherein at least one of the sets of first wheels and second wheels are generally vertically adjustable so as to not interfere with the floor and/or tracks as the other of the sets of first wheels and second wheels rolls along the floor and/or tracks in the vehicle.

5. A seat assembly as set forth in claim 4, wherein the adjuster mechanism includes a latch for locking the seat assembly in one of a plurality of longitudinal positions along the track.

6. A seat assembly as set forth in claim 1, wherein the adjuster mechanism includes a latch for locking the seat assembly in one of a plurality of longitudinal positions along the track.

7. A seat assembly as set forth in claim 6, wherein the latch includes at least one hook for releasably coupling to a receiver that is fixedly secured to the track for locking the seat assembly in one of the plurality of longitudinal positions.

8. An automotive vehicle comprising:
    a floor;
    a first track fixedly secured to the floor and a second track fixedly secured to the floor, the first and second tracks extending longitudinally in a generally fore and aft direction in the vehicle, the first and second tracks being generally parallel and spaced apart in a transverse direction in the vehicle; and
    a seat assembly having:
        a seat cushion with an upper surface for supporting a seated occupant above a floor of an automotive vehicle and an opposite bottom surface; and
        an adjuster mechanism coupled to the bottom surface of the seat cushion, the adjuster mechanism including a set of first wheels that allows movement of the seat assembly in a longitudinal direction along one of the first and second tracks, the adjuster mechanism further including a set of second wheels that are arranged generally orthogonal to the first wheels to allow movement of the seat assembly in a transverse direction between the tracks.

9. A seat assembly as set forth in claim 8, wherein the first wheels are selectively movable between a retracted position above the second wheels and a use position extending below the second wheels.

10. A seat assembly as set forth in claim 8, wherein the second wheels are selectively movable between a retracted position above the first wheels and a use position extending below the first wheels.

11. A seat assembly as set forth in claim 8, wherein at least one of the sets of first wheels and second wheels are generally vertically adjustable so as to not interfere with the floor and/or tracks as the other of the sets of first wheels and second wheels rolls along the floor and/or tracks in the vehicle.

12. A seat assembly as set forth in claim 11, wherein the adjuster mechanism includes a latch for locking the seat assembly in one of a plurality of longitudinal positions along the track.

13. A seat assembly as set forth in claim 8, wherein the adjuster mechanism includes a latch for locking the seat assembly in one of a plurality of longitudinal positions along the track.

14. A seat assembly as set forth in claim 13, wherein each track includes a plurality of arranged longitudinally receivers.

15. A seat assembly as set forth in claim 14, wherein the latch includes a latch hook for releasably coupling it to one of the receivers for locking the seat assembly in one of the plurality of longitudinal positions.

16. A seat assembly as set forth in claim 1, wherein the second have a predetermined diameter that corresponds with a width of the track to provide a detent for transversely locating the second wheels relative to the tracks and ensuring proper alignment of the first wheels for rolling engagement along the tracks.

* * * * *